(12) United States Patent
Bennett

(10) Patent No.: US 6,978,853 B2
(45) Date of Patent: Dec. 27, 2005

(54) AXLE ASSEMBLY WITH PARALLEL MOUNTED ELECTRIC MOTORS

(75) Inventor: John L. Bennett, Fraser, MI (US)

(73) Assignee: ArvinMeritor Technology LLC, Troy, MI (US)

( * ) Notice: Subject to any disclaimer, the term of this patent is extended or adjusted under 35 U.S.C. 154(b) by 134 days.

(21) Appl. No.: 10/630,066

(22) Filed: Jul. 30, 2003

(65) Prior Publication Data

US 2005/0023053 A1 Feb. 3, 2005

(51) Int. Cl.⁷ .............................................. B60K 1/00
(52) U.S. Cl. ................ 180/65.1; 180/65.7; 180/297
(58) Field of Search ................ 180/65.1, 65.6, 180/65.7, 291, 297, 376

(56) References Cited

U.S. PATENT DOCUMENTS

| | | | |
|---|---|---|---|
| 1,093,631 A * | 4/1914 | Kennedy | 180/349 |
| 1,251,749 A * | 1/1918 | Cilley | 180/65.6 |
| 1,810,834 A * | 6/1931 | Klein | 105/113 |
| 3,799,284 A * | 3/1974 | Hender | 180/65.2 |
| 4,588,040 A | 5/1986 | Albright, Jr. et al. | |
| 5,100,368 A | 3/1992 | Chien | |
| 5,120,282 A * | 6/1992 | Fjallstrom | 475/5 |
| 5,201,691 A | 4/1993 | Doyle | |
| 5,558,589 A | 9/1996 | Schmidt | |
| 5,827,148 A | 10/1998 | Seto et al. | |
| 5,927,417 A * | 7/1999 | Brunner et al. | 180/65.6 |
| 5,947,855 A * | 9/1999 | Weiss | 475/5 |
| 5,951,424 A | 9/1999 | Briceland | |
| 6,041,877 A | 3/2000 | Yamada et al. | |
| 6,053,833 A | 4/2000 | Masaki | |
| 6,083,138 A | 7/2000 | Aoyama et al. | |
| 6,083,139 A | 7/2000 | Deguchi et al. | |
| 6,090,005 A | 7/2000 | Schmidt et al. | |
| 6,098,733 A | 8/2000 | Ibaraki et al. | |
| 6,110,066 A | 8/2000 | Nedungadi et al. | |
| 6,170,587 B1 | 1/2001 | Bullock | |
| 6,358,176 B1 | 3/2002 | Nauheimer et al. | |
| 6,371,878 B1 | 4/2002 | Bowen | |
| 6,378,638 B1 | 4/2002 | Mizon et al. | |
| 6,398,685 B1 | 6/2002 | Wachauer et al. | |
| 6,401,850 B1 | 6/2002 | Bowen | |
| 6,481,519 B1 | 11/2002 | Bowen | |
| 6,499,549 B2 | 12/2002 | Mizon et al. | |
| 6,793,600 B2 * | 9/2004 | Hiraiwa | 475/5 |

OTHER PUBLICATIONS

Hybrid Diesel-Electric Engines, http://www.g2mil.com/hybrid.htm.

* cited by examiner

*Primary Examiner*—Christopher P. Ellis
*Assistant Examiner*—Brian Swenson
(74) *Attorney, Agent, or Firm*—Carlson, Gaskey & Olds

(57) ABSTRACT

An axle assembly includes a first and a second electric motor which drive a gearbox assembly substantially therebetween. The electric motors drive the gearbox assembly which drives the vehicle wheels through a first and second axle shaft located along a first axis. The electric motors are located along axes which are substantially parallel to the first axis. The electric motors drive the gearbox assembly which includes a first stage gear reduction, a second stage gear reduction and a third stage gear reduction. A relatively lightweight and compact axle assembly is thereby provided which will benefit from an electric motor of reduced size.

25 Claims, 4 Drawing Sheets

AXLE ASSEMBLY WITH PARALLEL MOUNTED ELECTRIC MOTORS

BACKGROUND OF THE INVENTION

The present invention relates to an axle assembly which utilizes a plurality of electric motors, and more particularly to an axle configuration which locates the electric motors in a parallel arrangement relative to the axle assembly.

There is an increasing demand for the use of hybrid electric driven and hybrid electric assisted vehicles. Hybrid electric vehicles typically utilize electric motor driven axles which are often of a multi-axle configuration in military and specialty vehicle systems.

The electric motors are typically sized to meet both torque and speed requirements which may not be the most effective for the operational requirements of such vehicles. Relatively large electric motors are often utilized to meet the torque requirements which may result in an oversized motor for most operational conditions. Moreover, the relatively large electric motors may be difficult to package in a multi-axle vehicle configuration.

Accordingly, it is desirable to provide a lightweight and compact electric motor driven axle configuration which allows the usage of a multiple of relatively smaller electric motors for incorporation into a multi-axle military and specialty vehicle system.

SUMMARY OF THE INVENTION

The axle assembly according to the present invention includes a first and a second electric motor which drive a gearbox assembly substantially therebetween. The electric motors drive the gearbox assembly which drives the vehicle wheels through a first and second axle shaft located along a first axis. The electric motors are located along axes which are substantially parallel to the first axis.

The electic motors drive the gearbox assembly which includes at least a first stage gear reduction, a second stage gear reduction and a differential gear set. A third stage gear reduction may also be used and comprises a two-speed reduction gear set that includes the differential gear set substantially contained within the two-speed reduction gear set. A relatively lightweight and compact axle assembly is thereby provided which will benefit from an electric motor of reduced size.

Yet another axle assembly utilizes only a single electric motor for yet another vehicle configuration with minimal modification to the axle assembly.

The present invention therefore provides a lightweight and compact electric motor driven axle configuration which allows the usage of a multiple of relatively smaller electric motors for incorporation into a multi-axle military and specialty vehicle system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
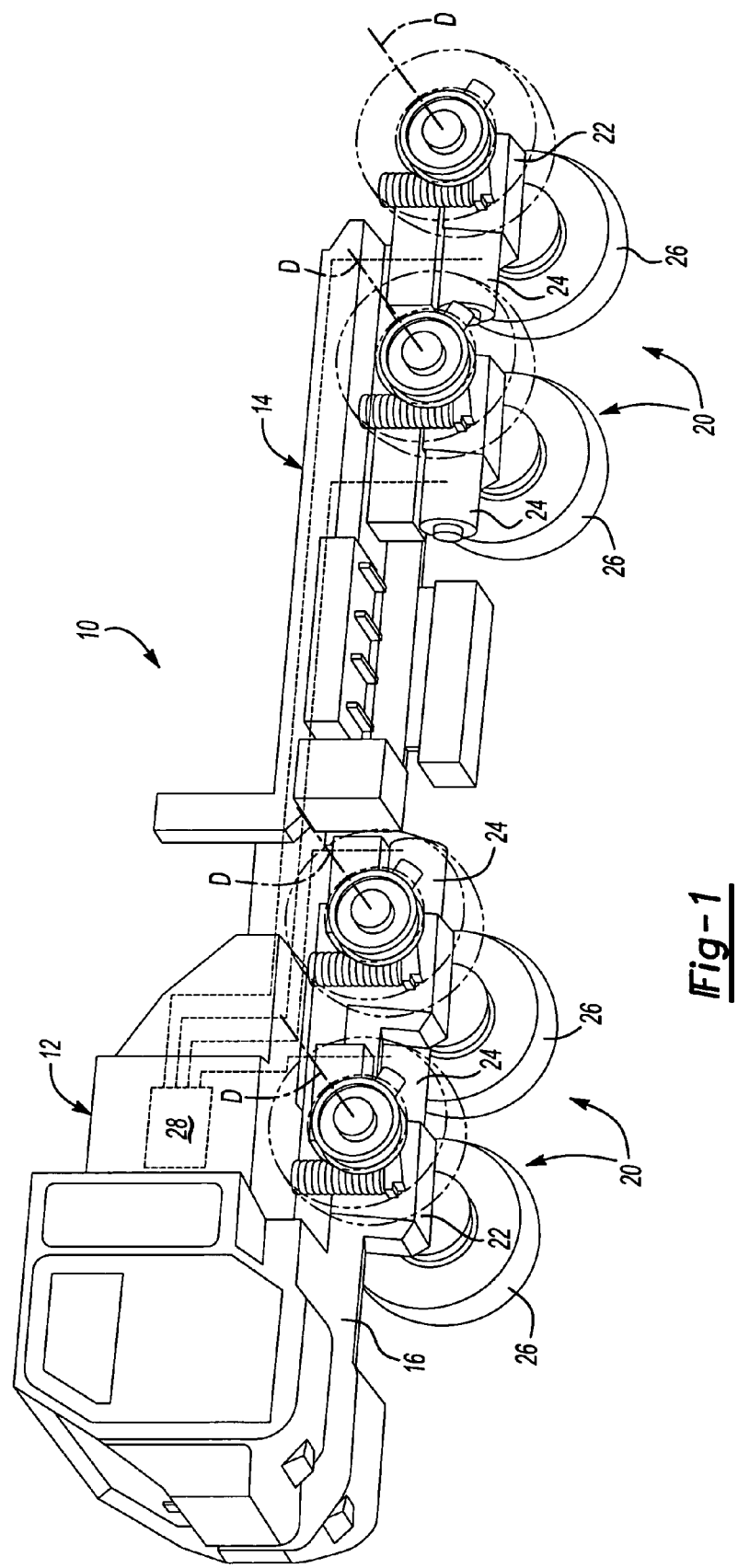
FIG. 1 is a general perspective view an exemplary multi-axle vehicle embodiment for use with the present invention.

FIG. 1 illustrates a schematic partial phantom view of a multi-axle vehicle 10 having a body 12 supported upon a frame 14. The frame 14 preferably includes a pair of main longitudinal members 16. It should be understood that although a particular vehicle arrangement is disclosed in the illustrated embodiment, other vehicles will benefit from the present invention.

A multiple of axle assemblies 20 each includes an axle 22 driven by one or more electric motors 24. Each axle assembly 20 defines an axis of rotation D substantially transverse the longitudinal members 16 to drive one or more wheels 26. The electric motors 24 are driven by a prime mover 28, which is preferably a hybrid electric drive that powers each of the axle assemblies 20 by powering the electric motors 24. It should be understood, however, that other prime movers such as diesel engines, gas turbines among others can be utilized with the present invention.

Figure 2:
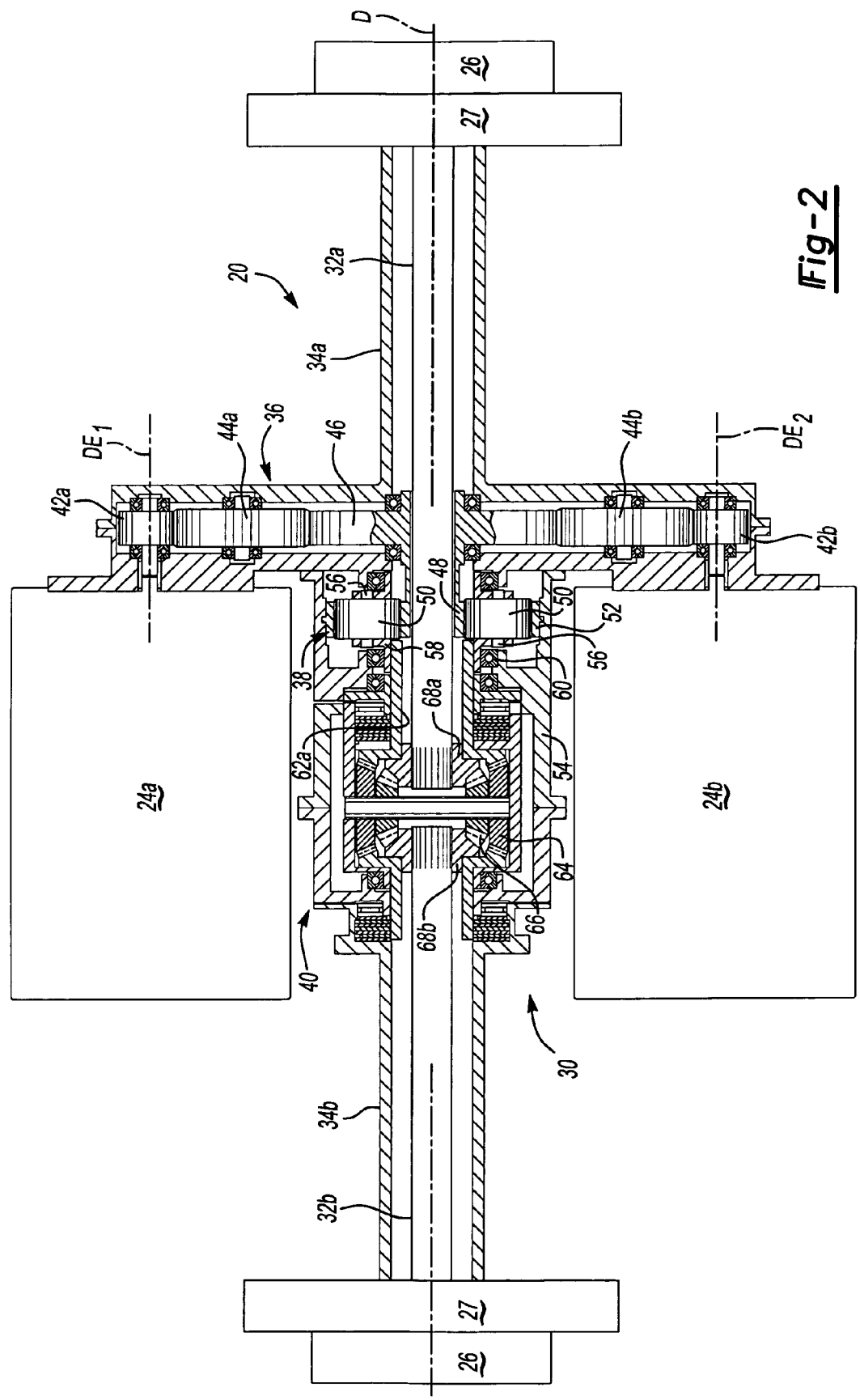
FIG. 2 is a schematic sectional view of an axle assembly of the present invention.

Referring to FIG. 2, first and second electric motors 24a, 24b drive a gearbox assembly 30 which drives the wheels 26 mounted to an independent suspension 27 (illustrated schematically). It should be understood that other axle configurations, such as a rigid axle, can be utilized with the present invention. The gearbox assembly 30 drives a first axle shaft 32a and a second axle shaft 32b located along axis D and contained with an axle housing 34a, 34b. The electric motors 24a, 24b are located along axes DE1 and DE2 which are substantially parallel to axis D. The electric motors 24a, 24b drive the gearbox assembly 30 which includes a first stage gear reduction 36, a second stage gear reduction 38 and a third stage gear reduction 40.

The first stage gear reduction 36 is driven by the electric motors 24a, 24b. The electric motors 24a, 24b drive a drive gear 42a, 42b respectively. Each drive gear 42a, 42b drives a respective idler gear 44a, 44b. The idler gears 44a, 44b drive a driven gear 46 which is preferably a sun gear. The drive gears 42a, 42b, the idler gears 44a, 44b and the driven gear 46 are located in a plane substantially perpendicular to axis D while each defines an axis of rotation substantially parallel to axis D. The driven gear's 46 axis of rotation is axis D.

The driven gear 46 preferably includes a sun gear 48 to a planetary gear set that forms the second stage gear reduction 38. The sun gear 48 drives a plurality of planet gears 50 which rotate within a ring gear 52. The ring gear 52 is preferably fixed within a second stage housing 54.

A multiple of pins 56, which each define an axis of rotation for a corresponding planet gear 50, is supported upon a planet carrier 58 which is supported upon bearing 60 which rotates within the second stage housing 54. The carrier 58 drives the third stage gear reduction 40 through an input side gear 62a which is coaxial with axis D.

The third stage gear reduction 40 is preferably a two-speed reduction gear set 64 that includes a differential gear set 66 substantially contained within the two-speed reduction gear set 64. A first differential axle side gear 68a drives the first axle shaft 32a and a second differential axle side gear 68b drives the second axle shaft 32b.

The differential gear set 66 is preferably nested within the two-speed reduction gear set 64. For further understanding of other aspects of the third stage gear reduction 40 and associated components thereof, attention is directed to U.S. patent application Ser. No. 10/630,417 (Express Mail No. EV221419178US), entitled TWO-SPEED GEARBOX WITH INTEGRATED DIFFERENTIAL, which is assigned to the assignee of the instant invention and which is hereby incorporated herein in its entirety. A relatively lightweight and compact axle assembly is thereby provided which will benefit from an electric motor of reduced size.

Figure 3:
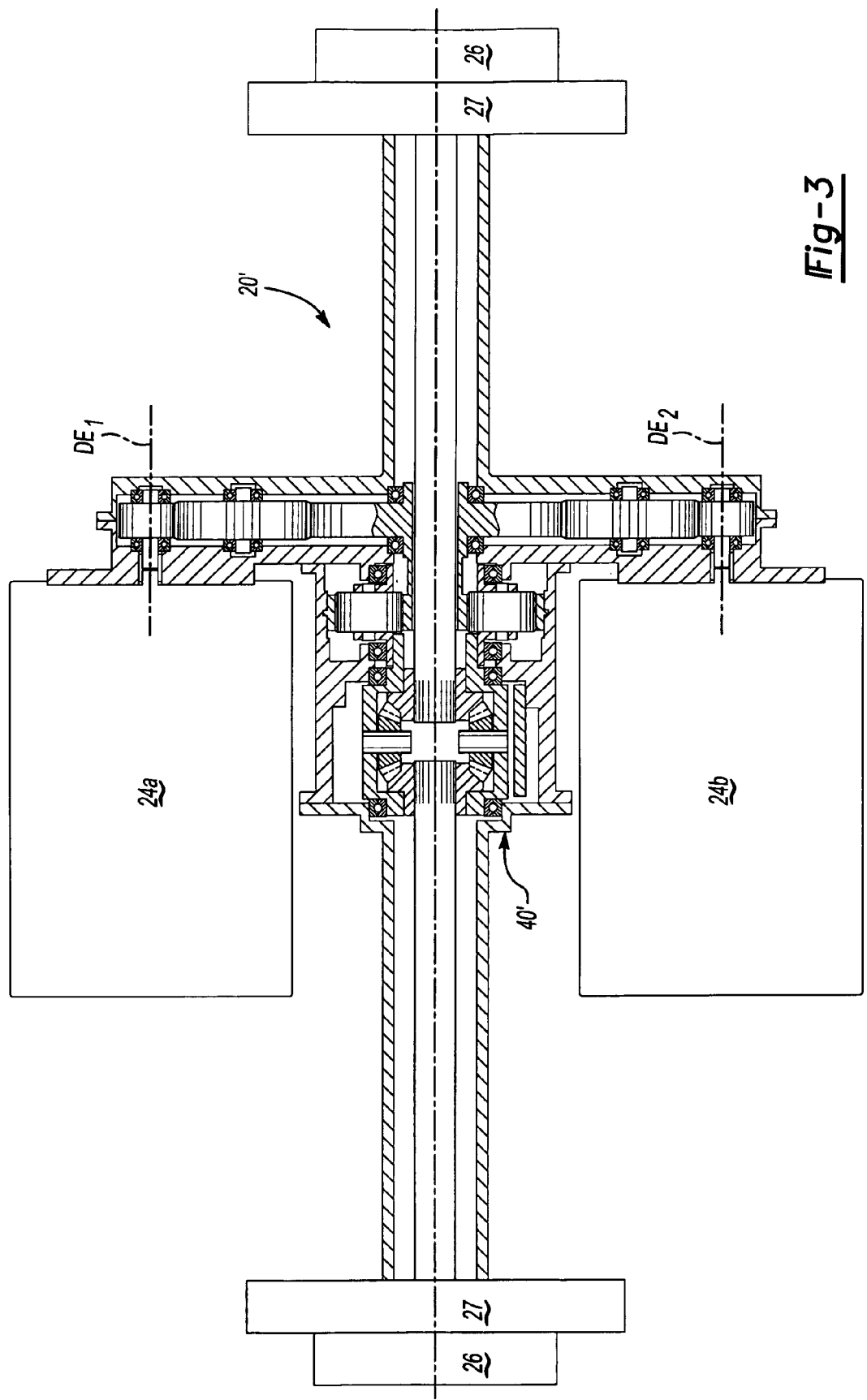
FIG. 3 is a schematic sectional view of an axle assembly of the present invention.

Referring to FIG. 3, an axle assembly 20' provides a single speed electric carrier that includes the differential gear set 66 that otherwise operates as described with reference to the FIG. 2 two-speed electric carrier. The single speed carrier is particularly preferred for a vehicle which, for example only, is of a lighter weight and/or which requires less off-road capability.

Figure 4:
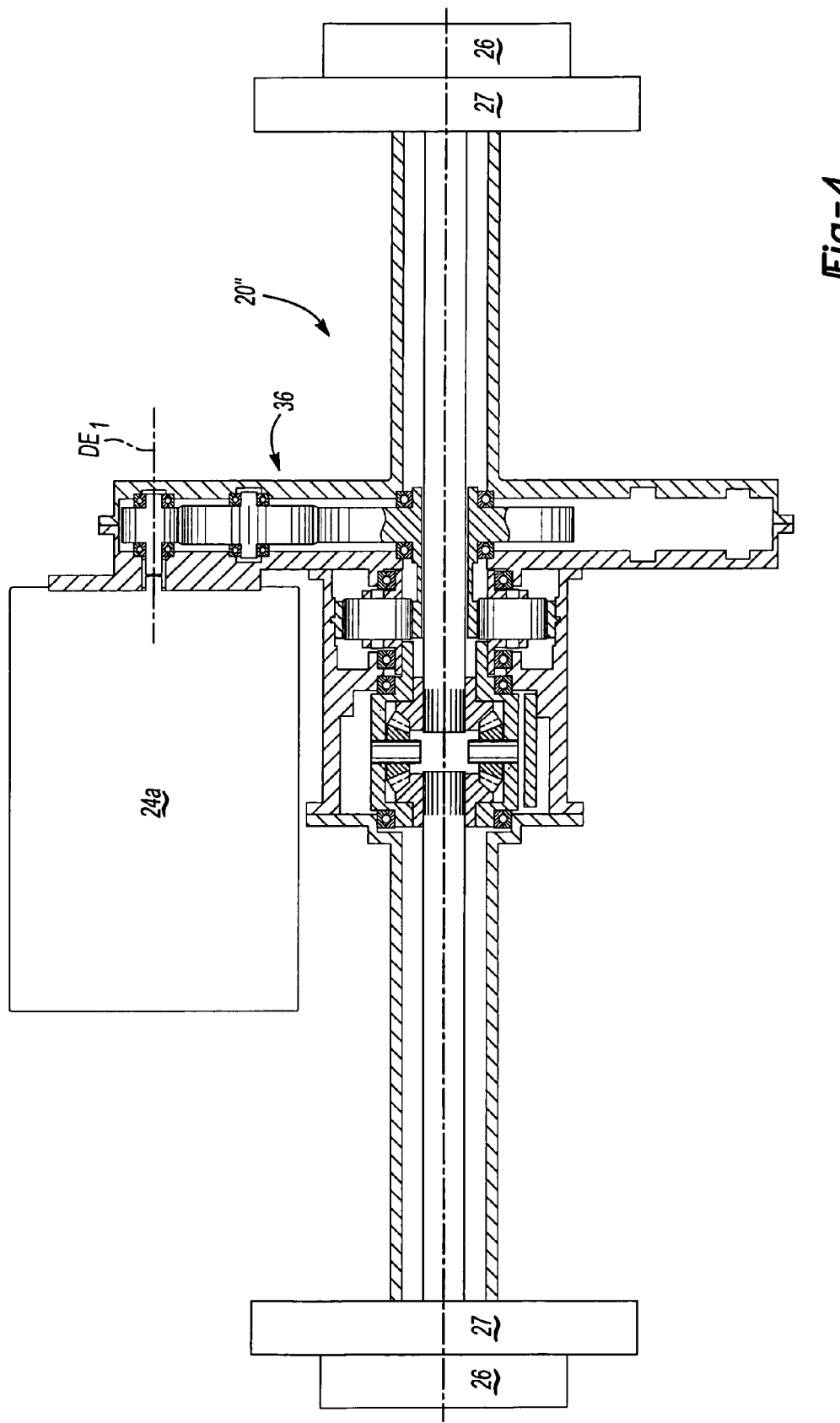
FIG. 4 is a schematic sectional view of an axle assembly of the present invention.

Referring to FIG. 4, another axle assembly 20" utilizes only a single electric motor 24a to illustrate that the axle assemblies 20, 20' of FIGS. 2 and 3 are module in nature. In other words, the first stage gear reduction 36 of the axle assembly 20" eliminates the electric motor 24b, drive gear 42b and idler gear 44b to provide a relatively lighter duty axle assembly 20" for yet another vehicle configuration without major modification to the axle assembly 20'. Axle assembly 20" otherwise operates as described with reference to the FIG. 3 axle assembly. It should be understood that various combinations of the axle assemblies described herein may be provided to particularly tailor an axle assembly to a particular vehicle in a modular manner.

It should be further understood that various bearing and seal locations are included within the gearbox. One of ordinary skill in the art, with the benefit of this disclosure, will consider the various bearing and seal locations to be an ordinary engineering problem such that intricate details thereof need not be fully discussed herein.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An axle assembly comprising:
a first axle shaft defined substantially along a first axis of rotation;
a second axle shaft defined substantially along said first axis of rotation;
at least one electric motor defined substantially along a second axis of rotation, said second axis of rotation extending along a direction having a component extending parallel to said first axis of rotation;
a first stage gear reduction driven by said at least one electric motor;
a second stage gear reduction driven by said first stage gear reduction; and
a differential gear set driven by said second stage gear reduction to drive said first axle shaft and said second axle shaft.

2. The axle assembly as recited in claim 1, wherein said at least one electric motor comprises a first electric motor defined by said second axis of rotation and a second electric motor defined along a third axis of rotation, said third axis of rotation extending along a direction having a component extending parallel to said first axis of rotation.

3. The axle assembly as recited in claim 2, wherein said second axis of rotation and said third axis of rotation are parallel to said first axis of rotation.

4. The axle assembly as recited in claim 1, wherein said first stage gear reduction comprises a drive gear which drives an idler gear, said idler gear drives a driven gear, and said driven gear drives said second stage gear reduction.

5. The axle assembly as recited in claim 4, wherein said driven gear is a sun gear within said second stage gear reduction.

6. The axle assembly as recited in claim 1, including a third stage gear reduction driven by said second stage gear reduction, said third stage gear reduction providing driving input into said differential gear set.

7. The axle assembly as recited in claim 6, wherein said third reduction gear set comprises a two-speed carrier.

8. An axle assembly comprising:
a first axle shaft defined substantially along a first axis of rotation;
a second axle shaft defined substantially along said first axis of rotation;
an electric motor defined substantially along a second axis of rotation, said second axis of rotation extending along a direction having a component extending parallel to said first axis of rotation;
a first stage gear reduction driven by said electric motor;
a second stage gear reduction driven by said first stage gear reduction;
a third stage gear reduction driven by said second stage gear reduction, said first axle shaft and said second axle shaft driven by said third stage gear reduction; and
wherein said second stage gear reduction comprises a planetary gear set.

9. The axle assembly as recited in claim 8, wherein said third stage gear reduction includes a differential gear set coupled to said first and second axle shafts.

10. The axle assembly as recited in claim 8, wherein said planetary gear set comprises a carrier which drives said third stage gear reduction.

11. An axle assembly comprising:
a first axle shaft defined substantially along a first axis of rotation;
a second axle shaft defined substantially along said first axis of rotation;
a first electric motor defined substantially along a second axis of rotation, said second axis of rotation extending along a direction having a component extending parallel to said first axis of rotation;
a second electric motor defined substantially along a third axis of rotation, said third axis of rotation extending along a direction having a component extending parallel to said first axis of rotation;
a first stage gear reduction driven by said first and second electric motors;
a second stage gear reduction driven by said first stage gear reduction; and
a differential gear set driven by said second stage gear reduction, said first axle shaft and said second axle shaft driven by said differential gear set.

12. The axle assembly as recited in claim 11, wherein said first stage gear reduction comprises a drive gear which drives an idler gear, said idler gear drives a driven gear, and said driven gear drives said second stage gear reduction.

13. The axle assembly as recited in claim 12, wherein said driven gear is coaxial with said first axle shaft.

14. The axle assembly as recited in claim 11, wherein said second stage gear reduction comprises a planetary gear set.

15. The axle assembly as recited in claim 14, wherein said planetary gear set comprises a carrier which drives said differential gear set, said carrier coaxial with said first axis of rotation.

16. The axle assembly as recited in claim 11, including a third stage gear reduction driven by said second stage gear reduction, said third stage gear reduction including an input side gear coaxial with said first axis of rotation, said input side gear driven by said second stage gear reduction.

17. The axle assembly as recited in claim 16, wherein said third stage gear reduction comprises a two-spaced carrier.

18. The axle assembly as recited in claim 11, wherein said second axis of rotation and said third axis of rotation are parallel to said first axis of rotation.

19. An axle assembly comprising:
a first axle shaft defined substantially along a first axis of rotation;
a second axle shaft defined substantially along said first axis of rotation;
a first electric motor defined substantially along a second axis of rotation, said second axis of rotation extending along a direction having a component extending parallel to said first axis of rotation;
a second electric motor defined substantially along a third axis of rotation, said third axis of rotation extending along a direction having a component extending parallel to said first axis of rotation;
a gearbox assembly comprising a first stage gear reduction driven by both said first and second electric motors, said gearbox assembly located substantially between said first and second electric motors to drive said first and second axle shafts, and said first stage gear reduction driving a common second stage gear reduction, said second axis of rotation and said third axis of rotation being spaced away from said first axis of rotation, and said first stage gear reduction being spaced from said first and second electric motors in a common axial direction such that said first electric motor and said second electric motor are spaced axially from said first stage gear reductions in a common direction.

20. The axle assembly as recited in claim 19, wherein said second stage gear reduction comprises a planetary gear set comprising a non-rotating ring gear fixed to a housing of said gearbox assembly.

21. The axle assembly as recited in claim 20, wherein said planetary gear set comprises a carrier coaxial with said first axis of rotation, said carrier adapted to drive a differential gear set coupled to said first and second axle shafts.

22. The axle assembly as recited in claim 19, wherein said second axis of rotation and said third axis of rotation are parallel to said first axis of rotation.

23. The axle assembly as recited in claim 19, wherein said second stage gear reduction is positioned on said first axis of rotation, with said first electric motor and said second electric motor being spaced radially outwardly of at least a portion of said second stage gear reduction.

24. The axle assembly as recited in claim 23, including a third stage gear reduction driven by said second stage gear reduction, said third stage gear reduction being positioned radially inwardly of said first and second electric motors, and at a position along said first axis of rotation at which said first and second electric motors are positioned.

25. The axle assembly as recited in claim 24, including a differential gear set driven by said third stage gear reduction, said differential gear set being coupled to said first and second axle shafts.

* * * * *